J. A. CAMERON.
MOVING PICTURE MACHINE.
APPLICATION FILED OCT. 18, 1912. RENEWED MAR. 14, 1919.
1,319,846.
Patented Oct. 28, 1919.
2 SHEETS—SHEET 1.
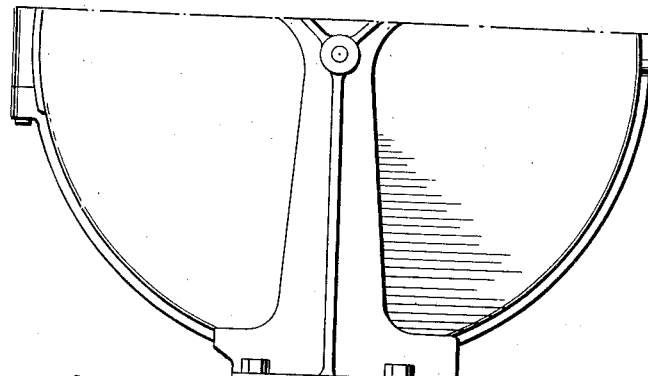
Fig. 1.
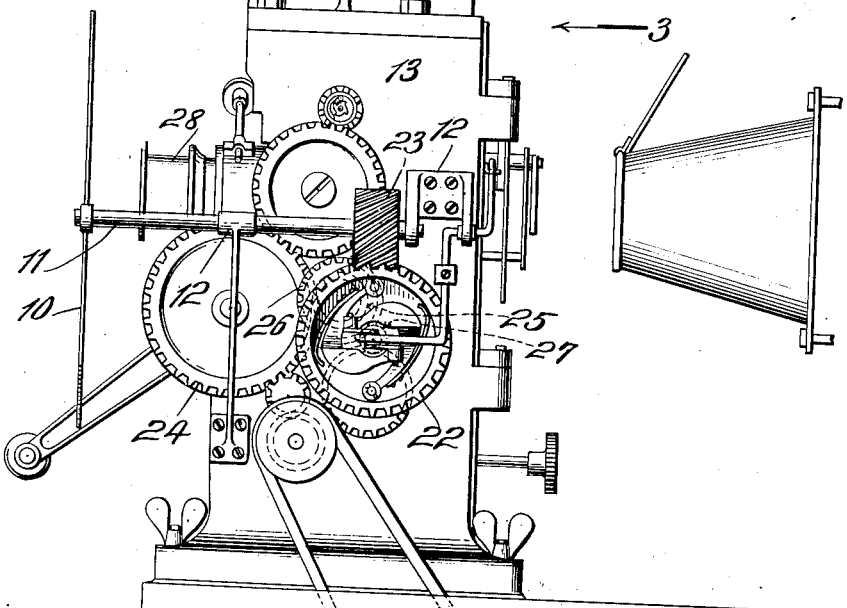
Fig. 2.
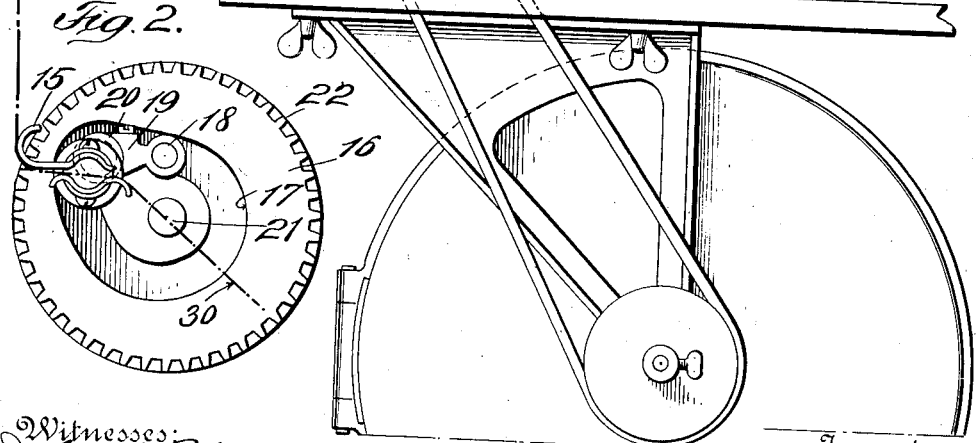
Witnesses:
Inventor
James A. Cameron
By his Attorneys J. A. CAMERON.
MOVING PICTURE MACHINE.
APPLICATION FILED OCT. 18, 1912. RENEWED MAR. 14, 1919.

1,319,846.

Patented Oct. 28, 1919.
2 SHEETS—SHEET 2.

UNITED STATES PATENT OFFICE.

JAMES A. CAMERON, OF BROOKLYN, NEW YORK, ASSIGNOR TO CAMERON PICTURE MACHINE CO., A CORPORATION OF NEW YORK.

MOVING-PICTURE MACHINE.

1,319,846.     Specification of Letters Patent.      Patented Oct. 28, 1919.

Application filed October 18, 1912, Serial No. 726,512. Renewed March 14, 1919. Serial No. 282,731.

*To all whom it may concern:*

Be it known that I, JAMES A. CAMERON, a citizen of the United States, and a resident of the borough of Brooklyn, in the county of Kings, city and State of New York, have invented certain new and useful Improvements in Moving-Picture Machines, of which the following is a specification.

My invention relates particularly to the means for intermittently advancing the film past the exposure opening and to the shutter which controls the exposure opening, the object of my invention being to insure an absolute and invariable timing of these two mechanisms with respect to each other. This object I accomplish by operating both these mechanisms from the same common driving shaft. In the construction which I have chosen to illustrate, the intermittent film advancing means is of the oscillatory type and its actuating means is a cam on a driving shaft, while the shutter is a rotary one and its actuating means is a gear on the same driving shaft. The two actuating means may be, and in fact are so shown, as being combined in the one single member.

Other features of the invention will appear as the specification proceeds.

I have illustrated in the accompanying drawings a preferred embodiment of the invention but I would have it understood that various changes and modifications may be made therein such as come within the scope of the appended claim.

In the drawings:

Figure 1 is a side elevation of a moving picture machine embodying my invention.

Fig. 2 is an enlarged detail view of the intermittent film advancing mechanism of such machine.

Similar reference characters have been used throughout the several views to indicate like parts.

Figure 3:
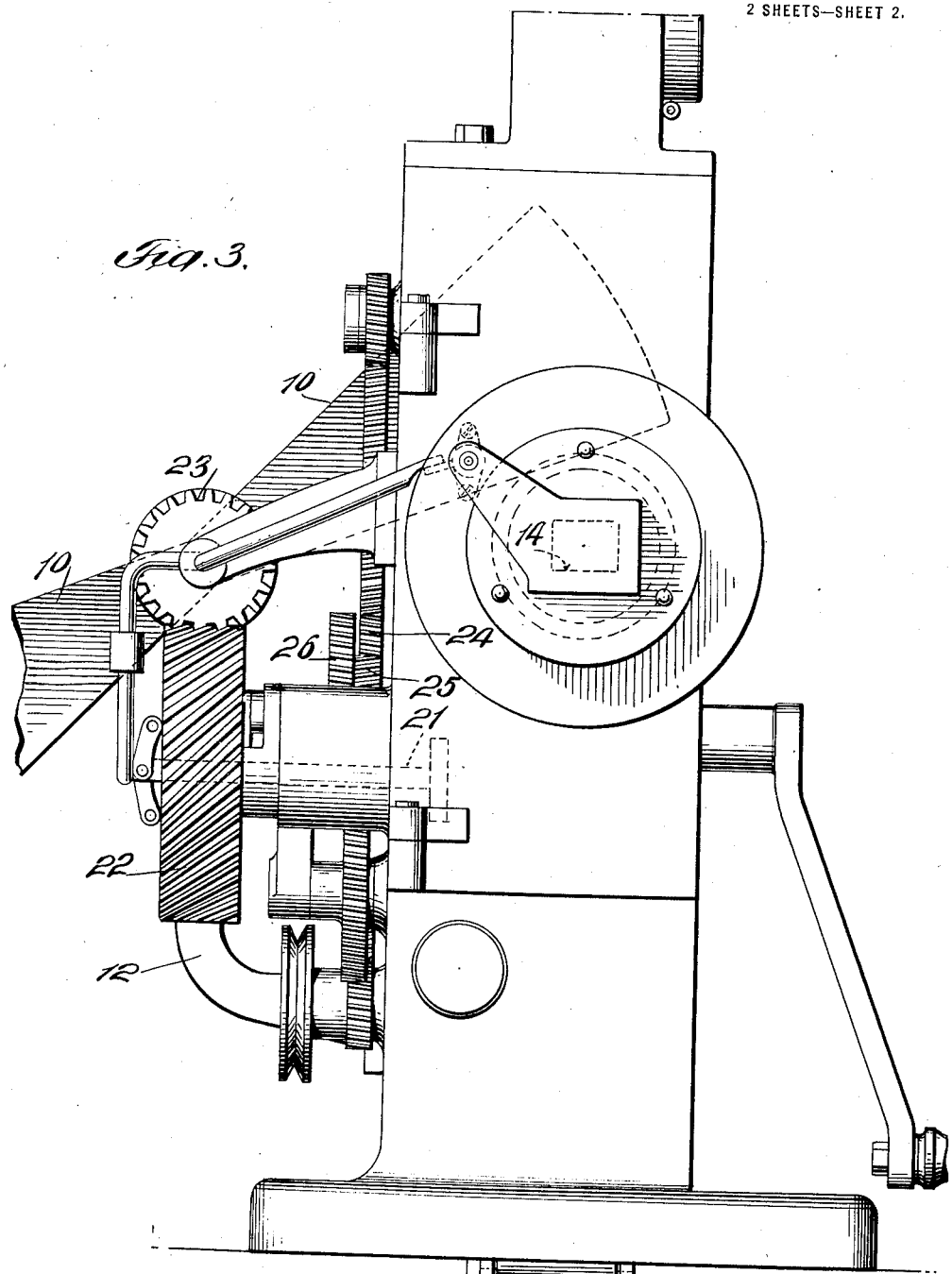
Fig. 3 is an enlarged rear view of the machine, looking in the direction of the arrow 3 in Fig. 1.

It is known in the art that rotary shutters possess certain advantages over shutters of the oscillatory type. Certain of these advantages are a smoother action, since there are no reversals of movement as in an oscillatory shutter; and greater speed in covering and uncovering the exposure opening. The greater peripheral speed which may be obtained in a rotary shutter is of particular advantage in that by reason of its relatively quick movement past the exposure opening the period of obscuration can be reduced to a minimum. A disadvantage, though, common to rotary shutters heretofore has been that such shutters are liable to get out of time with respect to the film advancing means; this on account of the fact that such shutters have ordinarily been driven from one of the driving members of the machine while the film advancing means has been operated from another one of the driving members of the machine more or less remote from the first driving member. In other words, in the prior machines the shutter and the film advancing means have not been directly interconnected and hence as the gearing wears, the shutter and the film advancing means will gradually get out of time with respect to each other. With my invention, however, this possibility is wholly obviated, for the shutter and the film advancing means are operated from a driving source common to both.

In the embodiment shown the rotary shutter consists of two shutter blades 10 mounted upon a rotary shaft 11, the said shaft being journaled in brackets 12 secured to the frame 13 of the machine or mounted in any other suitable fashion. The segmental shutter blades are, as best shown in Fig. 3, arranged during their rotation to pass in front of the exposure opening (14) of the machine, thereby controlling such opening. Only a single shutter blade may be used instead of the two illustrated, or, if found desirable, more blades than two may be employed. In any event one of the blades is made of such a width that it will cover the exposure opening substantially during the time that the film advancing means is operating to advance a picture length of the film. The other blades of the shutter, if there be such other blades, may act in a manner well known in the art to cause temporary obscurations in the picture during the period of exposure thereof, these temporary obscurations serving to diminish the effect of the flicker occasioned by the complete obscuration at the time of shifting the film, or, when the shutter is made with two diametrically opposite blades, as shown, instead of causing this temporary obscuration during periods of exposure, the shutter could be rotated at just half the usual speed, in which case the two blades will act alternately to cut off the light while successive pictures are being advanced.

The particular means which I have shown for advancing the film is like that disclosed in my Patent No. 1,020,383, wherein a beater 15, shown in detail in Fig. 2, through which the film 30 is passed, serves to intermittently advance the film, picture by picture, past the exposure opening. The means for operating the beater is here shown in the cam 16 formed with a cam groove 17 in which is engaged the cam roller 18, said cam roller being carried on a rocker arm 19 on the end of the shaft 20, which carries the beater. This actuating cam is mounted upon a driving shaft 21 and forms the balance wheel for the machine. The shutter is actuated by means carried by this same driving shaft, and such means here takes the form of a spiral gear 22 which meshes with a corresponding gear 23 on the shutter shaft 11. The parts are so set with respect to each other that at the time the beater is in the position shown in Fig. 2, wherein it is about to commence its downward stroke to thereby advance the film past the exposure opening, the shutter is in about the position shown in Fig. 3, wherein it is about to commence the obscuration of the exposure opening. The width of the shutter blade, as previously explained, is such that it will uncover the exposure opening at substantially the same time that the beater has finished advancing the film. By thus driving the film advancing means and the shutter from actuating devices mounted on the same common driving shaft, the two such mechanisms are always maintained absolutely in time with respect to each other. For convenience and simplicity of construction, the cam and the driving gear are here both combined in the one single member, substantially as illustrated.

Motion may be imparted to the driving shaft by means of suitable gearing; such gearing in the illustration consists of a main drive gear 24 which meshes with a pinion 25, this pinion carrying with it a gear 26 which meshes with the pinion 27 on the driving shaft 21. It will be noted that the shutter shaft 11 extends forwardly from the driving shaft 21 substantially at right angles thereto so as to support the shutter out in front of the lens tube 28. In the case illustrated the ratio of the gearing between the shutter shaft and the driving shaft is such that the shutter shaft rotates at twice the speed of the driving shaft.

What is claimed is:

The combination in a moving picture machine provided with an exposure opening, of film advancing means to intermittently advance the film across the exposure opening, a driving shaft, means on said shaft provided with a peripheral gear and an interior cam groove, a driven shaft extending at right angles to the driving shaft and driven from said peripheral gear, a shutter carried by said driven shaft, and means connecting said cam groove and said film advancing means to actuate the latter.

Signed at New York city in the county of New York and State of New York, this 7th day of October, A. D. 1912.

JAMES A. CAMERON.

Witnesses:
 AXEL V. BEEKER,
 PHILIP S. MCLEAN.